(12) United States Patent
Iwamoto et al.

(10) Patent No.: US 11,971,718 B2
(45) Date of Patent: Apr. 30, 2024

(54) CONTROL SYSTEM, CONTROL METHOD, AND PROGRAM

(71) Applicant: TOYOTA JIDOSHA KABUSHIKI KAISHA, Toyota (JP)

(72) Inventors: Kunihiro Iwamoto, Toyota (JP); Yuta Itozawa, Nagoya (JP); Hirotaka Komura, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/983,437

(22) Filed: Nov. 9, 2022

(65) Prior Publication Data

US 2023/0152808 A1 May 18, 2023

(30) Foreign Application Priority Data

Nov. 15, 2021 (JP) ................. 2021-185427

(51) Int. Cl.
 *G05D 1/00* (2006.01)
(52) U.S. Cl.
 CPC ......... *G05D 1/0212* (2013.01); *G05D 1/0227* (2013.01)

(58) Field of Classification Search
 CPC ............... G05D 1/0212; G05D 1/0227; G05D 2201/0216; G05D 1/0246
 See application file for complete search history.

(56) References Cited

U.S. PATENT DOCUMENTS

2021/0194388 A1   6/2021  Kaisha
2023/0131217 A1*  4/2023  Vistisen ............... G05D 1/0038

FOREIGN PATENT DOCUMENTS

| CN | 112586906 A | * | 4/2021 | ........... A47B 67/005 |
| JP | 2006123854 A | * | 5/2006 | ............ B62K 3/007 |
| JP | 2019062270 A | * | 4/2019 | ............ B62D 61/04 |
| JP | 2021-099724 A |   | 7/2021 | |

* cited by examiner

*Primary Examiner* — Anne Marie Antonucci
*Assistant Examiner* — Kirsten Jade M Santos
(74) *Attorney, Agent, or Firm* — Dinsmore & Shohl LLP

(57) ABSTRACT

A control system, a control method, and a program capable of lowering difficulty of a user's work on an autonomous mobile robot having a placement part are provided. A control system for controlling an autonomous mobile robot including a placement part on which a load is placed includes a user recognition unit configured to recognize a user of the placement part, a feature information acquisition unit configured to acquire feature information of the recognized user, and an operation control unit configured to control a height of the placement part based on the feature information.

5 Claims, 5 Drawing Sheets

CONTROL SYSTEM, CONTROL METHOD, AND PROGRAM

CROSS REFERENCE TO RELATED APPLICATIONS

This application is based upon and claims the benefit of priority from Japanese patent application No. 2021-185427, filed on Nov. 15, 2021, the disclosure of which is incorporated herein in its entirety by reference.

BACKGROUND

The present disclosure relates to a control system, a control method, and a program.

In recent years, techniques have been developed for transporting objects by autonomous mobile robots in factories, warehouses, or the like. For example, Japanese Unexamined Patent Application Publication No. 2021-099724 discloses an autonomous mobile robot having a placement part on which a load is placed. The autonomous mobile robot can transport a load by moving in a state in which the load is placed on the placement part.

SUMMARY

Various persons are assumed as users of an autonomous mobile robot having a placement part. Therefore, when a height of the placement part is constant, some users may feel it difficult to place a load on the placement part by hand or take a load off the placement part by hand.

An object of the present disclosure is to provide a control system, a control method, and a program capable of lowering the level of difficulty that the user may feel in performing a work using an autonomous mobile robot having a placement part.

In an example aspect of the present disclosure in order to achieve the above object, a control system for controlling an autonomous mobile robot including a placement part on which a load is placed, the control system including: a user recognition unit configured to recognize a user of the placement part; a feature information acquisition unit configured to acquire feature information of the recognized user; and an operation control unit configured to control a height of the placement part based on the feature information.

According to this control system, the height of the placement part is adjusted according to the recognized user. That is, the height of the placement part can be changed for each user. It is thus possible to lower the level of difficulty that the user may feel in performing a work with the autonomous mobile robot having the placement part.

In the above example aspect, the feature information may indicate an action of the recognized user when he/she has used the placement part in the past.

In this way, the height of the placement part can be adjusted based on the action when the user has used the placement part in the past. Therefore, the height of the placement part suitable for the user can be achieved.

In the above example aspect, the feature information may indicate whether or not the recognized user has used the placement part in a predetermined posture when he/she has used the placement part in the past.

In this way, it is possible to determine whether or not the height of the placement part is too low or too high for the user when he/she has used the placement part in the past. Therefore, an appropriate height of the placement part can be achieved.

In the above example aspect, the feature information may be about an instruction to change the height of the placement part, the instruction being input by the recognized user when he/she has used the placement part in the past.

In this way, it is possible to determine whether or not the height of the placement part is too low or too high for the user when he/she has used the placement part in the past. Therefore, an appropriate height of the placement part can be achieved.

In the above example aspect, an action detection unit configured to detect an action when the recognized user uses the placement part; and an action recording unit configured to store information indicating the detected action in a storage device may be further included.

In this way, the control system itself acquires information for adjusting the height of the placement part. Thus, such information can be automatically acquired.

In the above example aspect, the feature information may be information indicating a height of the user.

In this way, the height of the placement part can be adjusted according to the height of the user. Therefore, the height of the placement part suitable for the user can be achieved.

In another example aspect of the present disclosure in order to achieve the above object, a method for controlling an autonomous mobile robot including a placement part on which a load is placed, the method including: recognizing a user of the placement part; acquiring feature information of the recognized user; and controlling a height of the placement part based on the feature information.

According to this method, the height of the placement part is adjusted according to the recognized user. That is, the height of the placement part can be changed for each user. It is thus possible to lower the level of difficulty that the user may feel in performing a work with the autonomous mobile robot having the placement part.

In another example aspect of the present disclosure in order to achieve the above object, a program causes a computer for controlling an autonomous mobile robot including a placement part on which a load is placed to execute: recognizing a user of the placement part; acquiring feature information of the recognized user; and controlling a height of the placement part based on the feature information.

According to this program, the height of the placement part is adjusted according to the recognized user. That is, the height of the placement part can be changed for each user. It is thus possible to lower the level of difficulty that the user may feel in performing a work with the autonomous mobile robot having the placement part.

According to the present disclosure, it is possible to provide a control system, a control method, and a program capable of lowering the level of the difficulty that a user may feel in performing a work using an autonomous mobile robot having a placement part.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

An embodiment of the present disclosure will now be described with reference to the drawings.

Figure 1:
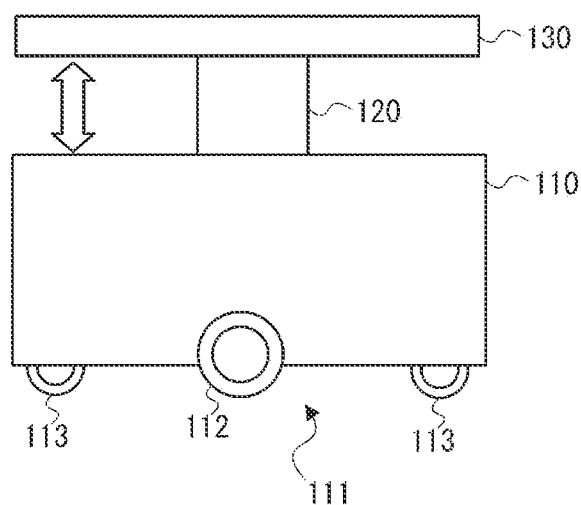
FIG. 1 is a schematic side view showing an example of an autonomous mobile robot according to an embodiment.
Figure 2:
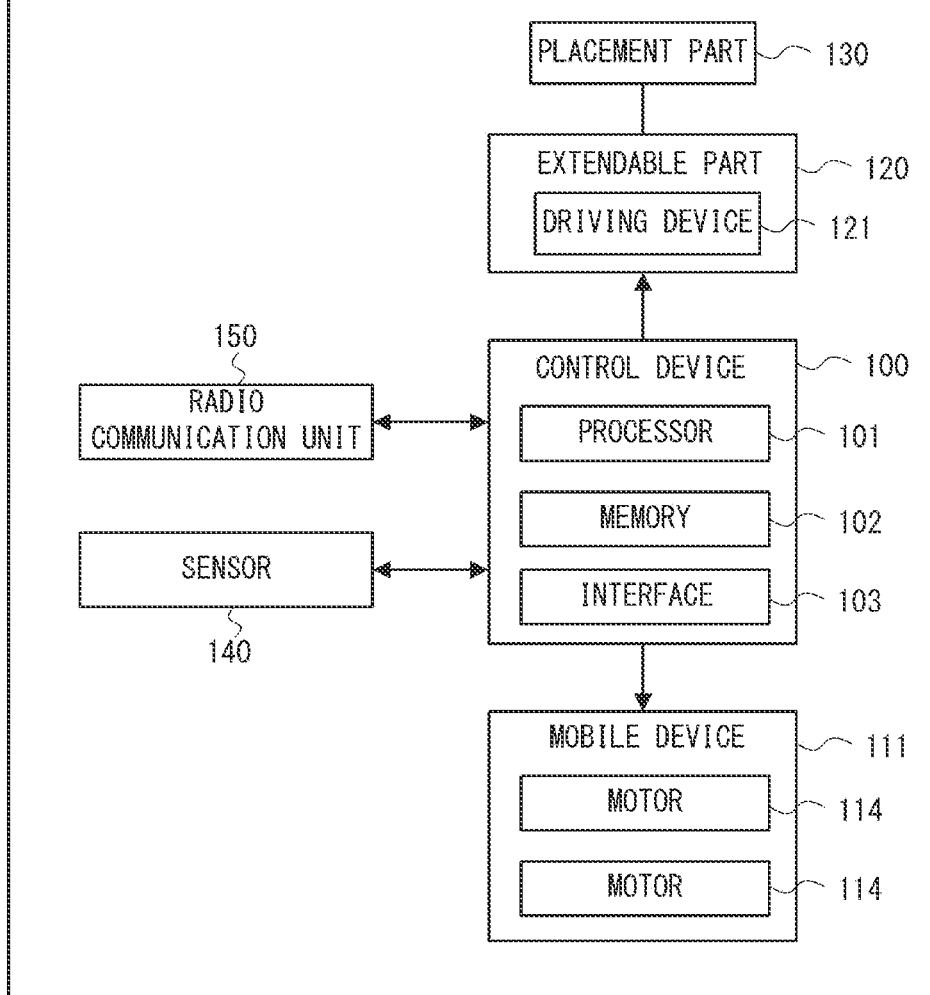
FIG. 2 is a block diagram showing an overview of system configuration of an autonomous mobile robot according to the embodiment.

FIG. 1 is a schematic side view showing an example of the autonomous mobile robot 10 according to this embodiment. FIG. 2 is a block diagram showing an overview of a schematic system configuration of the autonomous mobile robot 10 according to this embodiment.

The autonomous mobile robot 10 is a robot that moves autonomously in a mobile environment such as a house, a facility, a warehouse, a factory, or outdoors, and its operation is controlled by a control system. In this embodiment, a control device 100, which will be described later, of the autonomous mobile robot 10 functions as a control system, but some or all of the functions of the control system may be implemented by a device other than the autonomous mobile robot 10, such as a server.

The autonomous mobile robot 10 includes a chassis 110 provided with a mobile device 111 for moving the autonomous mobile robot 10, an extendable part 120 which is extendable and contractable in an up-down direction (in a vertical direction), a placement part 130 for supporting a load placed thereon, a control device 100 for controlling the autonomous mobile robot 10 including the control of the mobile device 111 and the extendable part 120, a sensor 140, and a radio communication unit 150.

The mobile device 111 provided in the chassis 110 includes a pair of left and right driving wheels 112 rotatably provided on the chassis 110, a pair of front and rear driven wheels 113 rotatably provided on the chassis 110, and a pair of motors 114 for rotationally driving the driving wheels 112, respectively. The respective motors 114 rotate the driving wheels 112 through a reduction gear or the like. The respective motors 114 rotate the driving wheels 112 in response to a control signal from the control device 100, thereby enabling the autonomous mobile robot 10 to move forward, backward, and rotate. Thus, the autonomous mobile robot 10 can move to any position. The configuration of the mobile device 111 is an example and is not limited thereto. For example, the number of the driving wheels 112 and the driven wheels 113 of the mobile device 111 may be any number, and any configuration can be employed as long as the autonomous mobile robot 10 can be moved to any position.

The extendable part 120 is an extendable mechanism which can be extended and contracted in the up-down direction, and is a support pillar for supporting the placement part 130 above the chassis 110. The extendable part 120 may be configured as a telescopic extendable mechanism. The placement part 130 is provided at an upper end of the extendable part 120, and the placement part 130 is raised or lowered by an operation of the extendable part 120. The extendable part 120 includes a driving device 121 such as a motor, and is extended or contracted by driving the driving device 121. That is, the placement part 130 is raised or lowered by driving the driving device 121. The driving device 121 is driven in response to a control signal from the control device 100. In the autonomous mobile robot 10, any known mechanism for controlling the height of the placement part 130 provided above the chassis 110 may be used instead of the extendable mechanism.

The placement part 130 is provided at an upper part (a leading end) of the extendable part 120. That is, the placement part 130 is provided above the chassis 110 of the autonomous mobile robot 10 with the extendable part 120 interposed therebetween. The placement part 130 is raised and lowered by the driving device 121 such as a motor. In this embodiment, the placement part 130 is used to place a load to be transported by the autonomous mobile robot 10 or to support and raise the load. In order to transport the load, the autonomous mobile robot 10 moves with the load in a state in which the load is being supported by the placement part 130. In this manner, the autonomous mobile robot 10 transports loads. Note that the autonomous mobile robot 10 may not be moved during transport by the autonomous mobile robot 10. That is, the transport may be the movement of the load in the up-down direction by the raising and lowering of the placement part 130. For example, the user places a load on the placement part 130 by hand in order to have the load carried by the autonomous mobile robot 10. In order to receive the load carried by the autonomous mobile robot 10, the user takes the load placed off the placement part 130 by hand.

The placement part 130 is made of, for example, a plate material. In this embodiment, a shape of the plate material, that is, the shape of the placement part 130 is, for example, a flat disk shape, but it may be any other shape.

The sensor 140 is installed at any position of the autonomous mobile robot 10, and is a sensor for detecting information about an external appearance of the user. For example, the sensor 140 is a camera, and instead may be any sensor that detects the information about an external appearance of an object, such as a LiDAR (light detection and ranging) sensor. An output of the sensor 140 is input to the control device 100.

The radio communication unit 150 is a circuit for radio communication in order to communicate with the server or another robot as needed, and includes, for example, a radio transmission and reception circuit and an antenna. If the autonomous mobile robot 10 does not communicate with other devices, the radio communication unit 150 may be omitted.

The control device 100 controls the autonomous mobile robot 10 and includes a processor 101, a memory 102, and an interface 103. The processor 101, the memory 102, and the interface 103 are connected to each other via a data bus or the like.

The interface 103 is an input/output circuit used to communicate with other devices such as the mobile device 111, the extendable part 120, the sensor 140, and the radio communication unit 150.

The memory 102 is composed of, for example, a combination of a volatile memory and a non-volatile memory. The memory 102 is used to store software (computer program) including one or more instructions executed by the processor 101, data used for various processing of the autonomous mobile robot 10, and the like.

The processor 101 reads software (computer program) from the memory 102 and executes it to perform processing of the control device 100, which will be described later.

The processor 101 may be, for example, a microprocessor, a Micro Processor Unit (MPU), or a central processing unit (CPU). The processor 101 may include a plurality of processors.

In this way, the control device 100 functions as a computer.

The program includes instructions (or software codes) that, when loaded into a computer, cause the computer to perform one or more of the functions described in the embodiment. The program may be housed in a non-transitory computer readable medium or a tangible housing medium. By way of example, and not a limitation, non-transitory computer readable media or tangible housing media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc housing, and magnetic cassettes, magnetic tape, magnetic disk housing or other types of magnetic housing devices. The program may be transmitted on a transitory computer readable medium or a communication medium. By way of example, and not a limitation, transitory computer readable media or communication media can include electrical, optical, acoustical, or other forms of propagated signals.

Figure 3:
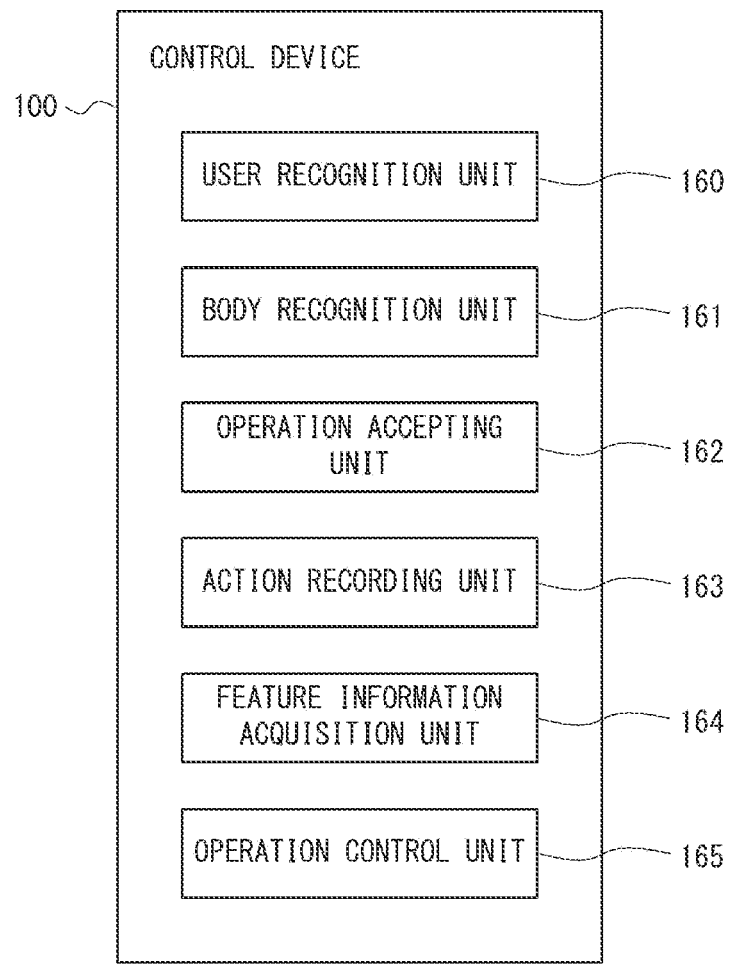
FIG. 3 is a block diagram showing an example of a functional configuration of a control device of the autonomous mobile robot according to the embodiment.

FIG. 3 is a block diagram showing an example of the functional configuration of the control device 100 of the autonomous mobile robot 10. As shown in FIG. 3, the control device 100 includes a user recognition unit 160, a body recognition unit 161, an operation accepting unit 162, an action recording unit 163, a feature information acquisition unit 164, and an operation control unit 165.

The user recognition unit 160 recognizes the user of the placement part 130. The user recognition unit 160 analyzes output data from the sensor 140 to recognize the user. For example, the user recognition unit 160 recognizes the user by performing image recognition processing on image data output from the sensor 140. In this way, the user is specified. The user recognition unit 160 may recognize the user by identifying physical features such as the user's face from the output data of the sensor 140, or may recognize the user by the sensor 140 reading an ID card possessed by the user.

The body recognition unit 161 recognizes the height and posture of the user of the placement part 130. The body recognition unit 161 analyzes the output data from the sensor 140 and recognizes the height and the posture of the user. For example, the body recognition unit 161 performs image recognition processing on the image data output from the sensor 140 to recognize the height and posture of the user. In this way, the height and the posture of the user are specified. The body recognition unit 161 may recognize only one of the height and the posture of the user. When the body recognition unit 161 recognizes the height of the user, it may store the height of the user in a storage device such as the memory 102 in association with identification information of the user identified by the user recognition unit 160.

When the body recognition unit 161 recognizes the posture of the user, it especially recognizes the posture when the user uses the placement part 130. For example, the body recognition unit 161 may recognize the posture of the user when the user is in a position close to the autonomous mobile robot 10 (a position within a predetermined distance from the autonomous mobile robot 10) as the posture of the user when he/she uses the placement part 130, or may recognize the posture of the user when a weight of the placement part 130 changes as the posture of the user when he/she uses the placement part 130. The position of the user relative to the autonomous mobile robot 10 may be determined based on the output data of the sensor 140. The weight of the placement part 130 may be determined by a weight sensor or the like provided in the placement part 130. The body recognition unit 161 is an example of an action detection unit that detects an action when the user uses the placement part 130, and recognizes a posture of the user as an action thereof.

The operation accepting unit 162 accepts an input of an operation for instructing the raising or lowering of the placement part 130 issued by the user. That is, the operation accepting unit 162 accepts an input of an instruction to change the height of the placement part 130. The operation accepting unit 162 may accept the instruction by receiving a signal from, for example, a user interface (such as a button or a lever) provided in the autonomous mobile robot 10 and operated by a physical force (physical contact), or may accept the instruction by receiving an operation signal transmitted from a terminal or the like possessed by the user via the radio communication unit 150. The operation accepting unit 162 is an example of an action detection unit that detects an action when the user uses the placement part 130, and recognizes an input operation as an action.

The action recording unit 163 records information indicating the detected action. The action recording unit 163 records information indicating the detected action by storing it in a storage device such as the memory 102. The action recording unit 163 stores information indicating the action of the user in the storage device in association with the identification information of the user identified by the user recognition unit 160. For example, the action recording unit 163 stores, in the storage device, information indicating whether or not the user has used the placement part 130 in a predetermined posture. Here, the predetermined posture may be a posture in which the user feels it difficult to perform a work, and specifically, it may be a posture in which the user bends down (i.e., a posture in which the user bends his/her waist or knees, hereinafter referred to as a bending posture), a posture in which the user stands on his/her tiptoes (hereinafter referred to as a tiptoe posture), or a posture in which the user raises his/her hand at a position higher than a predetermined body part (e.g., shoulders). Further, the action recording unit 163 may store, in the storage device, information about the instruction to change the height of the placement part 130 input by the user when the user uses the placement part 130. For example, information indicating an instruction to raise the placement part 130 above a predetermined reference height may be recorded, information indicating an instruction to lower the placement part 130 below a predetermined reference height may be recorded, or information indicating the height of the placement part 130 achieved by the control in accordance with the input instruction may be recorded. Note that the action recording unit 163 may record either or both of the information about the posture of the user and the information about the instruction as the information indicating the action. The action recording unit 163 may record the height of the placement part 130 when the user uses the placement part 130 in a predetermined posture in association with information indicating the action, or may record the height of the placement part 130 when the user inputs the instruction to change the height of the placement part 130 in association with information about the instruction.

The feature information acquisition unit 164 acquires the feature information of the user recognized by the user recognition unit 160. The feature information of the user indicates the feature of the user related to the height of the placement part 130. That is, the feature information of the user is personal data related to the height of the placement part 130. Specifically, the feature information of the user may be information indicating an action when he/she has used the placement part 130 in the past. In this case, the feature information of the user may be information recorded by the action recording unit 163. The information indicating the action when the user has used the placement part 130 in the past may be information indicating whether or not the user has used the placement part 130 in a predetermined posture when he/she has used the placement part 130 in the past, or information regarding the instruction to change the height of the placement part 130 input when the user has used the placement part 130 in the past. By way of example, the feature information of the user is information indicating that the user has used the placement part 130 in the bending posture when he/she has used the placement part 130 in the past. By way of another example, the feature information of the user is information indicating the instruction to raise the placement part 130 above a predetermined height input when the user has used the placement part 130 in the past. These are only examples of the feature information, and the feature information is not limited to these examples. The feature information acquisition unit 164 reads out the information corresponding to the user recognized by the user recognition unit 160 from among pieces of the feature information (e.g., information recorded by the action recording unit 163) previously stored in the storage device such as the memory 102 to thereby acquire the feature information indicating an action when the user has used the placement part 130 in the past. The feature information acquisition unit 164 does not necessarily need to acquire the information recorded by the action recording unit 163. For example, the feature information acquisition unit 164 may acquire the feature information stored in the storage device by input by each user or administrator through an input device. In this case, the action recording unit 163 may be omitted. On the other hand, the presence of the action recording unit 163 allows the control device 100 itself to acquire information for adjusting the height of the placement part 130, and thus has an advantage that such information can be automatically acquired.

By acquiring the information indicating whether or not the user has used the placement part 130 in the predetermined posture when he/she has used the placement part 130 in the past as the feature information, it is possible to determine whether or not the height of the placement part 130 is too low or too high for the user when he/she has used the placement part 130 in the past. Therefore, as will be described later, an appropriate height of the placement part 130 can be achieved. In addition, by acquiring information about the instruction to change the height of the placement part 130, which has been input by the user when the placement part 130 has been used in the past, as the feature information, it is possible to determine whether the height of the placement part 130 is too low or too high for the user when he/she has used the placement part 130 in the past. Therefore, as will be described later, an appropriate height of the placement part 130 can be achieved.

The feature information of the user may be information indicating the height of the user. In this case, the feature information acquisition unit 164 may acquire the feature information by reading out the height corresponding to the user recognized by the user recognition unit 160 among the heights previously stored in the storage device such as the memory 102, or may acquire the height recognized by the body recognition unit 161 as the feature information. The height of the placement part 130 can be adjusted according to the height of the user by acquiring information indicating the height of the user as the feature information. Therefore, the height of the placement part 130 suitable for the user can be achieved.

The operation control unit 165 controls the autonomous mobile robot 10. Specifically, the operation control unit 165 mainly controls the operations of the mobile device 111 and the extendable part 120. The operation control unit 165 can control the rotation of each of the driving wheels 112, and move the autonomous mobile robot 10 to any position by transmitting a control signal to each of the motors 114 of the mobile device 111. Furthermore, the operation control unit 165 can control the height of the placement part 130 by transmitting a control signal to the driving device 121 of the extendable part 120.

The operation control unit 165 may control the movement of the autonomous mobile robot 10 by performing well-known control such as feedback control and robust control based on rotation information of the driving wheels 112 detected by rotation sensors provided on the driving wheels 112. The operation control unit 165 may control the mobile device 111 based on information including distance information detected by a distance sensor such as a camera or a ultrasonic sensor provided in the autonomous mobile robot 10 and map information of the mobile environment, thereby controlling the autonomous mobile robot 10 to autonomously move. Note that the sensor 140 for detecting the information about the external appearance of the user may be used to sense the mobile environment when the autonomous mobile robot 10 moves.

The operation control unit 165 controls the height of the placement part 130 based on the instruction accepted by the operation accepting unit 162. In this case, the operation control unit 165 changes the height of the placement part 130 in accordance with the accepted instruction. When the feature information acquisition unit 164 acquires the feature information, the operation control unit 165 controls the height of the placement part 130 based on the acquired feature information. In this case, specifically, the operation control unit 165 controls the height of the placement part 130 in accordance with a predetermined control rule corresponding to the acquired feature information. For example, the operation control unit 165 performs the following control.

If the feature information acquired by the feature information acquisition unit 164 is information indicating that the user has used the placement part 130 in the bending posture when he/she has used the placement part 130 in the past, the operation control unit 165 performs control to increase the height of the placement part 130 to a predetermined first height. If the feature information acquired by the feature information acquisition unit 164 is information indicating that the user has used the placement part 130 in the tiptoe posture or the posture in which the user raises his/her hand to a position higher than a predetermined body part when he/she has used the placement part 130 in the past, the operation control unit 165 performs control to lower the height of the placement part 130 to a predetermined second height. Note that, in such control, the operation control unit 165 may perform control with reference to the height of the placement part 130 when the user has used the placement part 130 in such posture in the past. For example, if the feature information is information indicating that the user has used the placement part 130 in the bending posture, the operation control unit 165 may perform control to raise the placement part 130 to a height higher, by a predetermined value, than the height of the placement part 130 when the user has used the placement part 130 in that posture. Similarly, if the feature information is information indicating that the user has used the placement part 130 in the tiptoe posture or the posture in which the user raises his/her hand to the position higher than the predetermined body part, the operation control unit 165 may perform control to lower the placement part 130 to a height lower, by a predetermined value, than the height of the placement part 130 when the user has used the placement part 130 in that posture.

If the feature information acquired by the feature information acquisition unit 164 is information indicating the instruction to raise the placement part 130 above the predetermined reference height, which has been input when the user has used the placement part 130 in the past, the operation control unit 165 performs control to raise the height of the placement part 130 to the predetermined first height. The predetermined first height may be higher than the predetermined reference height by a predetermined value. If the feature information acquired by the feature information acquisition unit 164 is information indicating the instruction to lower the placement part 130 below the predetermined reference height, which has been input when the user has used the placement part 130 in the past, the operation control unit 165 performs control to lower the height of the placement part 130 to the predetermined second height. The predetermined second height may be lower than the predetermined reference height by a predetermined value. Note that, in such control, the operation control unit 165 may perform control with reference to the height of the placement part 130 when the user inputs the instruction to change the height of the placement part 130. For example, if the feature information is information indicating the instruction to raise the placement part 130 above the predetermined reference height, the operation control unit 165 may perform control to raise the placement part 130 to a height higher, by a predetermined value, than the height of the placement part 130 when the user inputs the instruction to raise the height of the placement part 130. Similarly, if the feature information is information indicating the instruction to lower the placement part 130 below the predetermined reference height, the operation control unit 165 may perform control to lower the placement part 130 to a height lower, by a predetermined value, than the height of the placement part 130 when the user inputs the instruction to lower the height of the placement part 130. When the feature information acquired by the feature information acquisition unit 164 is information indicating the height of the placement part 130 achieved by the control in accordance with the instruction input when the user has used the placement part 130 in the past, the operation control unit 165 performs control so that the height of the placement part 130 becomes the height indicated in the feature information.

When the feature information acquired by the feature information acquisition unit 164 is information indicating the height of the user, the operation control unit 165 performs control so that the height of the placement part 130 becomes a height corresponding to the height of the user.

Figure 4:
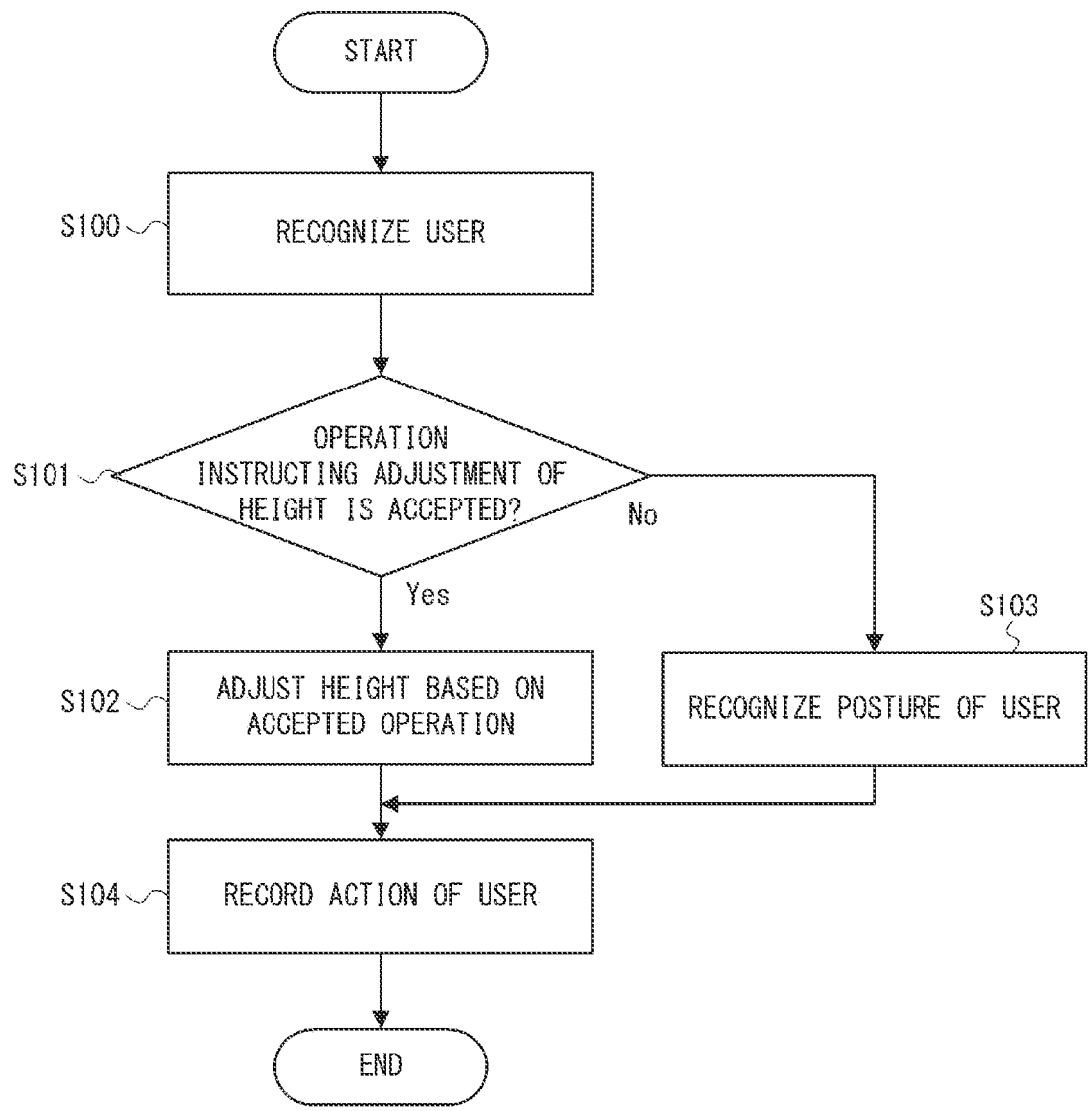
FIG. 4 is a flowchart showing an example of a processing flow relating to control of a height of a placement part performed by the autonomous mobile robot according to the embodiment.
Figure 5:
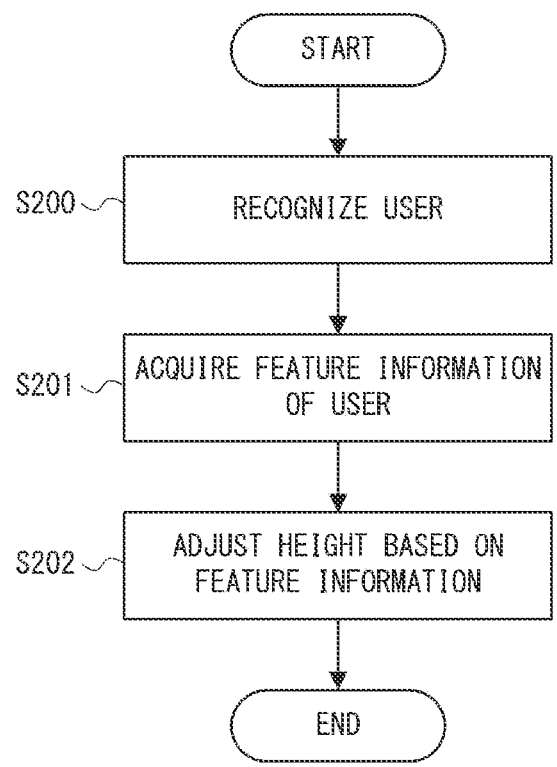
FIG. 5 is a flowchart showing an example of a processing flow relating to the control of the height of the placement part performed by the autonomous mobile robot according to the embodiment.

FIGS. 4 and 5 are flowcharts showing an example of a processing flow relating to the control of the height of the placement part 130 performed by the autonomous mobile robot 10 according to this embodiment. In particular, FIG. 4 shows an example of a processing flow when the user uses the placement part 130 for the first time. FIG. 5 shows an example of a processing flow when the user uses the placement part 130 again.

First, an example of a processing flow when the user uses the placement part 130 for the first time will be described with reference to the flowchart of FIG. 4.

In Step S100, the user recognition unit 160 recognizes the user of the placement part 130.

Next, in Step S101, it is determined whether or not the operation accepting unit 162 has accepted an input of an operation instructing adjustment of the height of the placement part 130. If the input of the operation instructing the adjustment of the height of the placement part 130 is accepted (Yes in Step S101), the processing proceeds to Step S102, otherwise (No in Step S101), the processing proceeds to Step S103.

In Step S102, the operation control unit 165 controls the height of the placement part 130 based on the operation (the instruction) accepted by the operation accepting unit 162. The user performs, for example, an operation of adjusting the height of the placement part 130 so that the height of the placement part 130 becomes the one easy for the user to perform a work. After Step S102, the processing proceeds to Step S104.

In Step S103, the body recognition unit 161 recognizes the posture of the user when the user uses the placement part 130. After Step S103, the processing proceeds to Step S104.

In Step S104, the action recording unit 163 records information indicating the action as the information about the user recognized in Step S100. More specifically, when an input of an operation instructing adjustment of the height of the placement part 130 is accepted, the action recording unit 163 records the information about the instruction to change the height of the placement part 130. The action recording unit 163 records information indicating whether or not the posture recognized in Step S103 is a predetermined posture (e.g., the bending posture).

In the flowchart shown in FIG. 4, only the posture of the user is recognized in Step S103, but both the posture and the height of the user may be recognized.

Next, an example of the processing flow when the user uses the placement part 130 again will be described with reference to the flowchart of FIG. 5.

In Step S200, the user recognition unit 160 recognizes the user of the placement part 130.

Next, in Step S201, the feature information acquisition unit 164 acquires the feature information of the user recognized in Step S200. Specifically, the feature information acquisition unit 164 reads out the information recorded in Step S104 of FIG. 4 to thereby acquire the feature information of the user.

Next, in Step S202, the operation control unit 165 adjusts the height of the placement part 130 based on the feature information acquired in Step S201. If a plurality of kinds of feature information are acquired for the same user in Step S201, the operation control unit 165 controls the height of the placement part 130 based on the feature information selected according to a predetermined priority order from among the plurality of kinds of feature information. Although not shown in the flowchart shown in FIG. 5, when the user uses the placement part 130 again, an input of an instruction for adjusting the height of the placement part 130 may be accepted, and control in accordance with the instruction may be performed.

Embodiments have been described above. The autonomous mobile robot 10 according to this embodiment adjusts the height of the placement part according to the recognized user. That is, the height of the placement part can be changed for each user. It is thus possible to lower the level of difficulty that the user may feel in performing a work with the autonomous mobile robot 10 having the placement part 130. Specifically, it is possible to lower the level of the difficulty that the user may feel in placing a load on the placement part 130 by hand or in taking a load off the placement part 130 by hand. In particular, when the acquired feature information is information indicating an action when the user has used the placement part 130 in the past, the height of the placement part 130 can be adjusted based on the action when the user has used the placement part 130 in the past. Therefore, the height of the placement part 130 suitable for the user can be achieved.

The present disclosure is not limited to the above-described embodiment, and may be suitably modified without departing from the scope thereof. For example, some or all of the components shown in FIG. 3 may be implemented in a device other than the autonomous mobile robot 10, such as a server, or the sensor 140 may be provided separately from the autonomous mobile robot 10.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A control system for controlling an autonomous mobile robot including a placement part on which a load is placed, the control system comprising a processor that is configured to:
    recognize a user of the placement part;
    acquire feature information of the recognized user;
    control a height of the placement part to a predetermined value based on the feature information, the feature information indicates whether or not the recognized user has used the placement part in a predetermined posture when he/she has used the placement part in the past, and
    when the feature information indicates that the recognized user has used the placement part in a tiptoe posture or a posture in which the recognized user raises his/her hand to a position higher than a predetermined body part, control lowering of the placement part to a height lower, by the predetermined value, than a height of the placement part when the recognized user has used the placement part in that posture.

2. The control system according to claim 1, wherein the processor is further configured to:
    detect an action when the recognized user uses the placement part; and
    store information indicating the detected action in a storage device.

3. The control system according to claim 1, wherein the feature information is information indicating a height of the recognized user.

4. A method for controlling an autonomous mobile robot including a placement part on which a load is placed, the method comprising:
    recognizing a user of the placement part;
    acquiring feature information of the recognized user;
    controlling a height of the placement part to a predetermined value based on the feature information, the feature information indicating whether or not the recognized user has used the placement part in a predetermined posture when he/she has used the placement part in the past, and
    when the feature information indicates that the recognized user has used the placement part in a tiptoe posture or a posture in which the recognized user raises his/her hand to a position higher than a predetermined body part, controlling lowering of the placement part to a height lower, by the predetermined value, than a height of the placement part when the recognized user has used the placement part in that posture.

5. A non-transitory computer readable medium storing a program for causing a computer for controlling an autonomous mobile robot including a placement part on which a load is placed to execute:
    recognizing a user of the placement part;
    acquiring feature information of the recognized user;
    controlling a height of the placement part to a predetermined value based on the feature information, the feature information indicating whether or not the recognized user has used the placement part in a predetermined posture when he/she has used the placement part in the past, and
    when the feature information indicates that the recognized user has used the placement part in a tiptoe posture or a posture in which the recognized user raises his/her hand to a position higher than a predetermined body part, controlling lowering of the placement part to a height lower, by the predetermined value, than a height of the placement part when the recognized user has used the placement part in that posture.

* * * * *